(12) United States Patent
Hellman

(10) Patent No.: US 7,596,316 B2
(45) Date of Patent: Sep. 29, 2009

(54) METHOD OF SENDING PACKET-FORMED INFORMATION OPTICALLY USING DIFFERENT WAVE-LENGTHS FOR ADDRESS AND USEFUL INFORMATION

(76) Inventor: Esko Hellman, Rautiaisentie 17 A, FIN-02660 Espoo (FI)

( * ) Notice: Subject to any disclaimer, the term of this patent is extended or adjusted under 35 U.S.C. 154(b) by 550 days.

(21) Appl. No.: 10/239,218

(22) PCT Filed: Mar. 19, 2001

(86) PCT No.: PCT/FI01/00273
§ 371 (c)(1),
(2), (4) Date: Dec. 9, 2002

(87) PCT Pub. No.: WO01/71958
PCT Pub. Date: Sep. 27, 2001

(65) Prior Publication Data
US 2003/0108352 A1    Jun. 12, 2003

(30) Foreign Application Priority Data
Mar. 22, 2000    (FI) .................................. 20000670

(51) Int. Cl.
*H04J 14/00* (2006.01)
(52) U.S. Cl. ........................................................ 398/47
(58) Field of Classification Search ............. 398/41–58, 398/66, 79
See application file for complete search history.

(56) References Cited

U.S. PATENT DOCUMENTS

| | | | | |
|---|---|---|---|---|
| 5,488,501 A | * | 1/1996 | Barnsley ...................... | 398/51 |
| 5,541,756 A | | 7/1996 | Chang-Hasnaln et al. | |
| 5,600,466 A | * | 2/1997 | Tsushima et al. ............. | 398/79 |
| 5,617,233 A | * | 4/1997 | Boncek ........................ | 398/51 |
| 5,796,501 A | * | 8/1998 | Sotom et al. .................. | 398/59 |
| 5,864,414 A | * | 1/1999 | Barnsley et al. .............. | 398/71 |
| 5,982,516 A | * | 11/1999 | Murphy et al. ................ | 398/51 |
| 6,009,409 A | | 12/1999 | Adler et al. | |
| 6,009,490 A | | 12/1999 | Fukui et al. | |
| 6,111,673 A | * | 8/2000 | Chang et al. ................. | 398/796 |

(Continued)

FOREIGN PATENT DOCUMENTS

EP    0 794 684 A1    9/1997

(Continued)

OTHER PUBLICATIONS

Myungsik Yoo; Chunming Qiao, "A novel switching paradigm for buffer-less WDM networks", OFC/IOOC'99. Technical Digest, vol. 3, Feb. 21-26, 1999 pp. 177-179.*

(Continued)

*Primary Examiner*—Quan-Zhen Wang

(57) ABSTRACT

The invention relates to a method and a system for the transferring of packet-switched information in a telecommunication system which comprises a router (R) to which an optical cable (LC) is connected that consists of optical fibres (LF) to which two wavelengths of light are sent and which is connected to the telecommunication network (CN), in which method, at the router (R), the piece of address information is received from the address wavelength (AWL) of the optical fibre (LF); and the payload information is received at the router (R) from the payload wavelength (DWL) of the optical fibre (LF). In the method, the payload wavelength (DWL) is routed based on the received piece of address information.

35 Claims, 4 Drawing Sheets

U.S. PATENT DOCUMENTS

| | | | |
|---|---|---|---|
| 6,501,575 B2 | 12/2002 | Salomaa et al. | |
| 6,556,318 B1 * | 4/2003 | Goldstein et al. | 398/9 |
| 6,721,315 B1 * | 4/2004 | Xiong et al. | 370/389 |
| 6,748,170 B1 * | 6/2004 | Clinkler | 398/47 |
| 6,813,407 B2 * | 11/2004 | Ramaswami et al. | 385/16 |

FOREIGN PATENT DOCUMENTS

| | | |
|---|---|---|
| JP | 04013334 A * | 1/1992 |
| WO | WO 93/21708 | 10/1993 |
| WO | WO 00/04654 | 1/2000 |

OTHER PUBLICATIONS

X. Yuan, R. Gupta, R. Melhem, "Distributed control in optical WDM networks", IEEE Conference Proceedings, Military Communications Conference, 1996. MILCOM '96.*

International Search Report for International Application No. PCT/FI2001/00273, date of mailing Aug. 20, 2001; 3 pgs.

The International Preliminary Examination Report for PCT/FI2001/00273 completed on Jun. 28, 2002.

The Written Opinion for PCT/FI2001/00273 mailed on Jun. 7, 2002.

The Communication for EP application No. 01 921 374.1 dated Apr. 23, 2007.

* cited by examiner

Transmission unit

Node of an optical packet-switched network

METHOD OF SENDING PACKET-FORMED INFORMATION OPTICALLY USING DIFFERENT WAVE-LENGTHS FOR ADDRESS AND USEFUL INFORMATION

BACKGROUND OF THE INVENTION

1. Field of the Invention

The invention relates to telecommunication systems. In particular, the invention relates to a method of sending packet-formed information optically, using different wavelengths of an optical cable, in such a way that one part of the wavelengths is used to transmit the address information of the packet and the part other is used to transmit the useful information. When packets are being routed, the router transmitting the packets in the telecommunication network reads only the address information on the address wavelength and sends the packets that came along with the useful wavelength further on based on the address.

2. Description of the Prior Art

The use of packet-switched telecommunication networks is becoming common because more and more formats of telecommunication, e.g. the traffic in accordance with the asynchronous transfer mode (ATM, Asynchronous Transfer Mode) and with the Internet protocol (IP, Internet Protocol), are being transferred in a packet-switched telecommunication network. Because of the packet-switched telecommunication networks, the same cable is used to transmit information of different formats, in which case less and less cables are needed and savings are made in the costs. Advancement in repeaters and routers enables building of faster and longer link connections.

Typically, telecommunication networks consist of link connections and routers. Usually it is the router that receives the packet, reads the address of the packet and sends the packet further on. If the packet has arrived at its destination, then the packet is taken off from the telecommunication network and is sent to the recipient.

One type of telecommunication networks form the optical cable networks. In the optical cable networks, true to the term, optical impulses are transmitted either in a glass or plastic conductor, which is called a fiber. The optical impulse is used to transport digitally coded information. It is possible to transmit the information in such a way that in a certain period of time the optical impulse means the same as bit 1, and the lacking of the optical impulse means the same as bit 0. Due to the longer spectral area of light, light may be used to transport more information than the traditional copper wire. Light is not sensitive to electromagnetic interference, either. Several telephone companies use optical fiber for the data transfer in long-distance lines. Since light weakens relatively fast in an optical cable, repeaters are needed in the optical cable line at regular intervals. Usually in an optical cable, information is being transferred in a digital form, in which case the advantages of digital data transfer are gained, such as a reliable and fast data transfer. Also the subtle attenuation in the optical cable and the large band width are the overpowering advantages of the optical cable as compared to copper wire. When speaking about an optical cable, the attenuation is used to mean the decrease of light output proceeding in the fiber of an optical cable.

The optical cable networks are divided into multi-mode and single-mode optical fiber networks. In the single-mode optical fiber networks, which are used in long-distance connections, only one beam of light is proceeding. In the multi-mode optical fiber networks, several beams of light are used with each of them having an individual angle of reflection. The beams of light in multi-mode optical fiber networks scatter faster than in a single-mode optical fiber network, and therefore the multi-mode optical fiber network is used only with short distances.

In wavelength division multiplexing, (WDM, Wavelength Division Multiplexing), in the same optical fiber, information is transmitted on different wavelengths. This makes it easy to increase the amount of the information to be transmitted in the fiber. For instance, if in a separate channel, information is being transported at the transfer rate of 2 Mbit/s, then the channels can be combined by wavelength division multiplexing, in which case it is possible to transfer 160 Mbit/s with a single optical fiber. Wavelength division multiplexing is sometimes called the dense wavelength division multiplexing (DWDM, Dense Wavelength Division Multiplexing).

When packet-formed information is being transmitted in a system multiplexed according to a wavelength in an optical fiber on just one wavelength, the header information, which is of a fixed form, is sent before the actual content of the packet. The header information is also separated from the actual content by a short guard time so that the router has time, based on the header information, to adjust the routing before the arrival of the useful information. The guard time is also used to prevent confusion, which might arise because different wavelengths use different rates. The packet is transmitted via the routing node based on the header information of the packet. If the packets arrive at the routing node via many different routes, then the packets have to be synchronized to certain periods. For routing, the router comprises a synchronizing device. In addition to the router, also buffering capacity is needed; several packets may not enter the same wavelength of the same link connection at the same time. To prevent the above-mentioned occurrence, optical buffering is needed. For optical data transmission, signal re-creation is needed in order to eliminate different signal mutilations, such as interfering signals, flutter and synchronization error (jitter).

Usually optical cable networks have been built between the exchanges of the telecommunication networks. Now with the Internet, the need for band width of digital services and telecommunication networks has increased, so the building of optical cable connections is getting closer to access networks.

Pulse code modulation (PCM, Pulse Code Modulation) is one mode of transferring analogously coded information digitally. In a transmitting analog signal, samples are taken according to a time slot defined by the sampling frequency. The amplitude of the samples is transformed into a binary number which may be represented by six bits. The bit encoded information is digitally transferred to the recipient, who reforms, based on the digital information, a new analog signal to be transmitted further on. Typically, an analog signal comprises voice, music or moving picture information. Usually in optical cables, information is transferred in a pulse code modulation form.

In a packet-switched data communication, the data to be transmitted, such as a file, is divided into small parts (packets) which are efficient to transfer and route in a telecommunication network. To the packets, an individualized serial number and address data are attached, after which the packets are transported by the telecommunication network. The packet-switched data transfer is connectionless, so no direct connection is established between the sender and the recipient, which is unlike a circuit-switched data transfer. In packet-switched data transfer, the packets are transferred along some telecommunication route to the recipient, in which case the packets may arrive at the destination also in an order which does not correspond to the original transmission order of packets. For arranging the packets in the right order, it is possible to use, e.g. the transfer control protocol (TCP, Transfer Control Protocol). When the packets are in the right order, the recipient combines the packets and receives the information to be transmitted. The Internet protocol or the asynchronous transfer mode are just one example of packet-switched traffic.

One problem is the rapid transmission of packet-formed information in an optical telecommunication network. In the optical telecommunication network, the packets are transformed in such a way that they can be transmitted by optical impulses. The sending and transferring of optical impulses succeeds relatively fast, but routing the optical impulses rapidly is difficult. If routing the telecommunication packets rapidly succeeds, then the output needed in the data transmission per telecommunication packet is lower, which saves cost.

There is no previous solution to the problems presented above. Previously, packet-formed information has been routed in such a way that on the same wavelength, both the address information and the useful information to be transported have been transmitted. Therefore, there has been a need for a guard time for the routing after the address information in order that the router has time to adjust the routing before the arrival of the information to be transported.

SUMMARY OF THE INVENTION

The objective of the present invention is to eliminate or at least to alleviate the disadvantages referred to above. One further objective of the invention is to disclose a new kind of method and system that enables implementing rapidly packet-switched data transfer. The invention also enables the optical switching of the useful wavelength, which is an essential improvement to the prior art.

By means of the invention, the packet-switched information transmitted in an optical cable is routed rapidly, because the address information is sent on a different wavelength than the useful information. Since the address information usually arrives at the router before the useful information, for the routing, it is easy to adjust the device controlling the useful wavelength in such a way that the transportation of packet-switched information is faster.

The invention relates to a method in which the router connected to the telecommunication network first receives the address information from the address wavelength of the optical fiber, after which the router receives the useful information to be transported from the useful wavelength of the optical fiber. After this, the router sends, based on the address information, the useful information to be transmitted on the useful wavelength. The optical cable connection connected to the router consists of one or more optical fibers which can be used to transmit information when modulated to the wavelength of light.

In a telecommunication network, in which there often are optical cable connections, it is possible to use a specific bit-formed address which enables one routing telecommunication packets rapidly through the optical cable connection. The address is simply transferred by way of the optical cable connection, i.e. the address is added to the packet when sending the packet, and is deleted from the packet, when the packet has arrived at its destination. Further, in a telecommunication network, information is transmitted so that in one optical fiber, several wavelengths of light are transferred by means of the wavelength division multiplexing. The data to be transmitted by the optical cable connection is routed on an optical transmission network level.

Due to the speed of the optical data transfer, there is a reason to use a certain guard time between the address information and the useful information to be transported. It should be noted that in optical cables, different wavelengths use slightly different rates, so guard time is needed also to separate the information packets proceeding in the cable from one another. In most of the cases, packet-formed information is in accordance with the Internet protocol which is transferred by the asynchronous transfer mode. In addition, for the transfer of packet-formed information, one or more optical wavelengths are reserved from the optical fiber.

For a telecommunication system, in which information is being transferred in an optical cable, a modulating, demodulating, response time computing and routing devices are needed. The modulating device transforms the packet-formed information to the address and useful wavelength to be transported in the optical fiber. The demodulating device transforms the information to be transferred on the address and useful wavelength back into a packet-switched form. The routing device routes the information to be transmitted in the optical fiber and to be transferred on the useful wavelength to the following router based on the address wavelength of the received information. The response time computing device is a device which enables one to wait for a process for a certain, accurately determined time. The response time computing device is used to create a guard time between the packets of the telecommunication network and the address information and the useful information. It is possible to enhance the data transfer by a multiplexing device which transfers several wavelengths in the same fiber by means of the wavelength division multiplexing. It is also possible to use a mirror device which is used to route the useful wavelength based on the routing information proceeding on the address wavelength. From the information flow to be transmitted in the optical fiber, a specific wavelength can be picked up by means of the mirror. The mirror is used to either allow or prevent the transmission of the wavelength to the fiber parts after the router. In that case, one bit is used to choose along which fiber part the information is transmitted. Instead of a mirror, a filter may be used. On the other hand, as the address information, color codes may be used. For each node of the telecommunication network, certain colors are determined, a set of optical wavelengths. When as the address, a certain wavelength is sent, it is known to which node of the telecommunication network the information to be transported is transmitted. If color codes are used as the address information, then it has to be seen to that the color code is extinguished after the routing, in which case the same color may be used several times. For extinguishing the color code, an extinguisher is used.

As compared to prior art, the invention provides the advantage that the packet-switched data transfer is faster. In that case, savings are made in the cost because the need for output per each telecommunication packet decreases. In addition, the invention provides the advantage of a faster method of transferring information in an optical fiber so that the information to be transferred on the useful wavelength is routed effectively by means of the address wavelength. The useful wavelength is used to mean the wavelength which is used to transfer the payload of a telecommunication packet. The greatest advantage of the invention is that there is no need to transform the information on the useful wavelength into a readable form and the information does need not be read because the address information is on a different wavelength. Thereby, the information on the useful wavelength may be directly connected to the following address, unless correction or amplification operations of the optical wavelength are needed.

BRIEF DESCRIPTION OF THE DRAWINGS

In the following section, the invention will be described by the aid of a few examples of its embodiments with reference to the accompanying drawing, in which.

DETAILED DESCRIPTION OF THE PREFERRED EMBODIMENTS OF THE INVENTION

Figure 1:
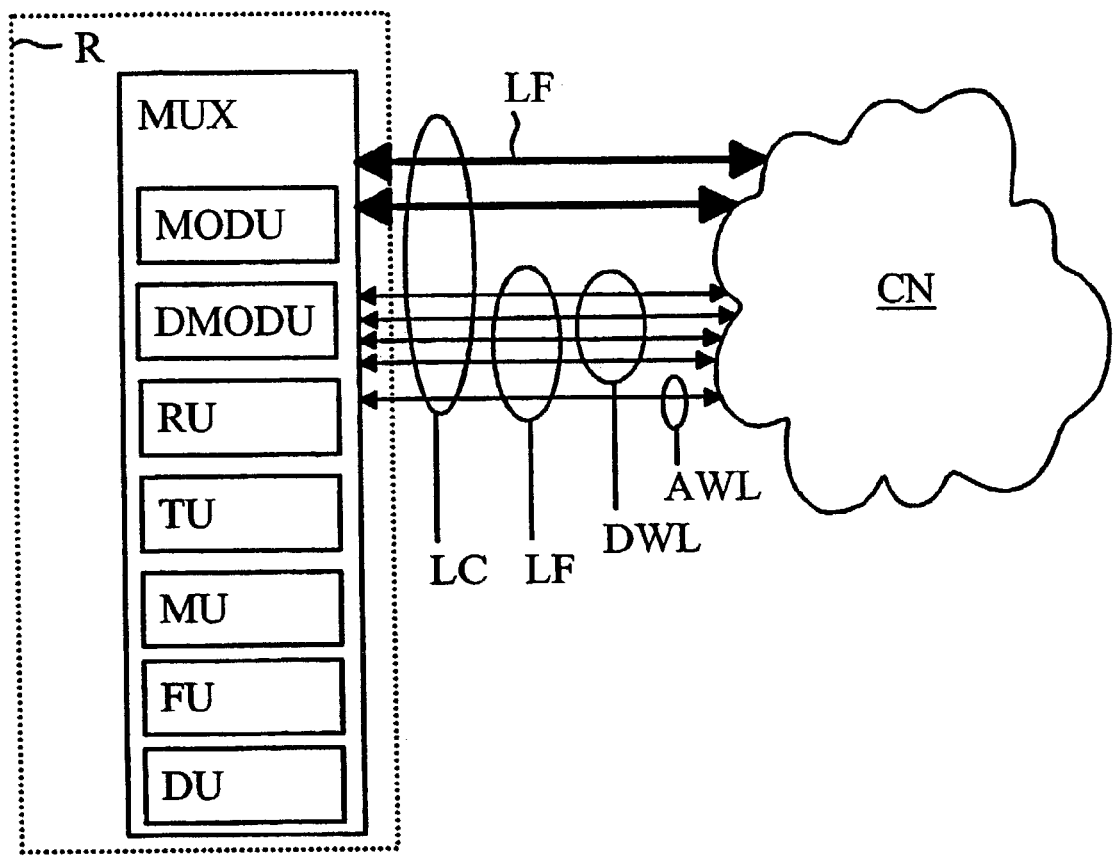
FIG. 1 represents one illustration of a system in accordance with the invention.

FIG. 1 represents one system in accordance with the invention. The router R is connected to the telecommunication network CN by way of an optical cable connection LC. Typically, the telecommunication network used is the Internet in which packet-switched information is transferred by the asynchronous transfer mode. The optical cable connection consists of an optical cable fiber LF in which packet-switched information is transferred as modulated on different wavelengths of light. The optical fiber connection LF further consists of a set of useful and address wavelengths. The useful wavelength DWL is used to transfer the useful information of a packet. The address wavelength AWL is used to transmit the address information of a packet and also information identifying on which useful wavelength DWL the useful information identified by the address is transported. The router R transmits the packet further on based on the address information. The router R consists of a multiplexing device MUX, a modulating device MODU, a demodulating device DMODU, a routing device RU, a response time counter TU, a mirror device MU and a filter device FU. In addition, the extinguisher DU may be used for extinguishing a color code.

Figure 2:
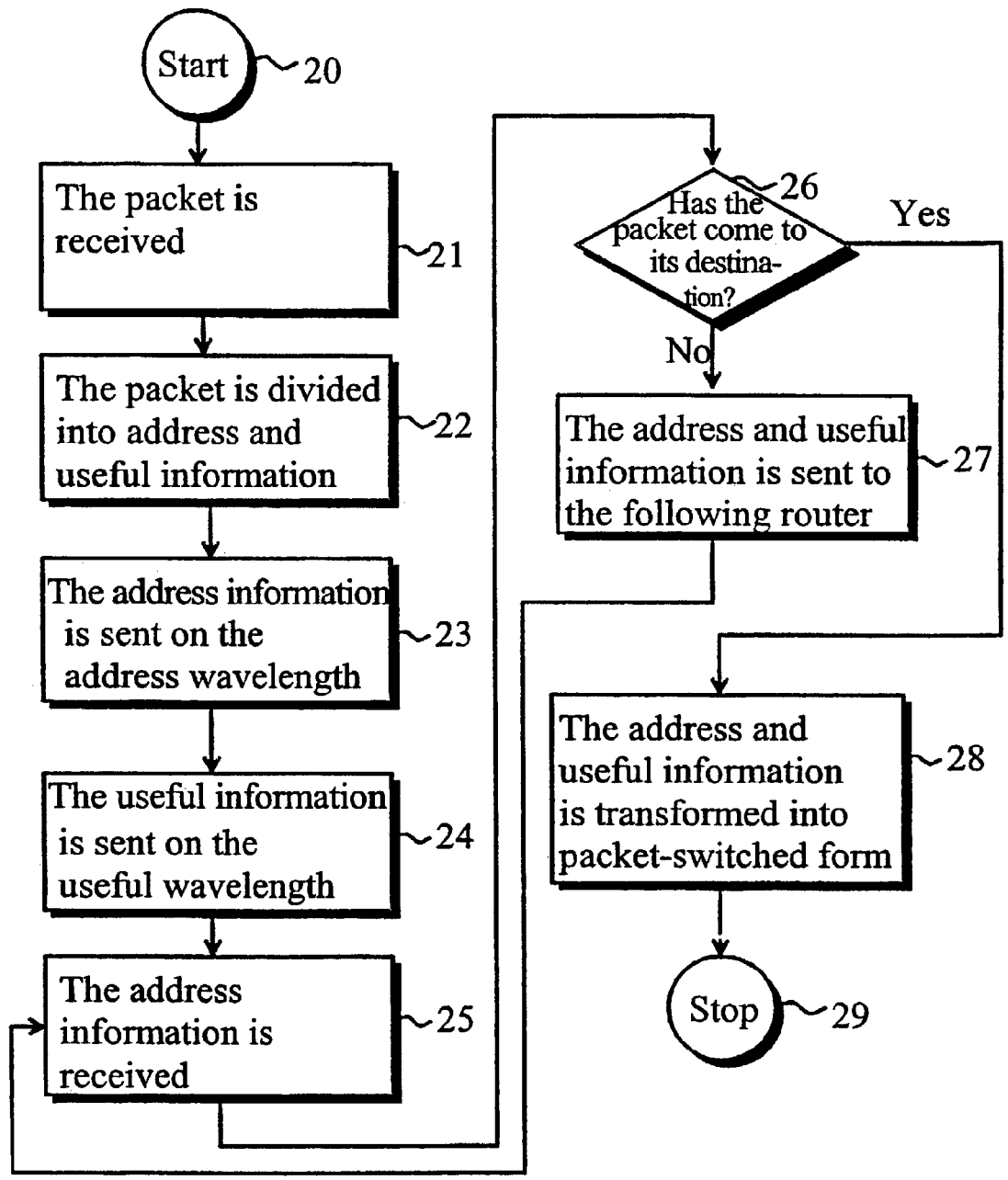
FIG. 2 represents one flow chart of a method in accordance with the invention.

FIG. 2 represents one diagram of a method in accordance with the invention. In the method, first a packet is received that consists of address and useful information (block 21). From the packet, the address information is separated and sent on the address wavelength (blocks 22 and 23). The information transported by the packet is sent on some useful wavelength of the optical cable connection in accordance with the address information (block 24). The address information is received and is transformed into a readable form in the following router, in which it is checked whether the packet has arrived at its destination (blocks 25 and 26). If the packet has not reached its destination, then the packet is directed further to the following router. If the address information connected with the packet tells that the packet has arrived at its destination, then the address and useful information is transformed into a packet-switched form and is sent further on, e.g. to the telecommunication network, in which the Internet protocol is used for data transfer.

Figure 3:
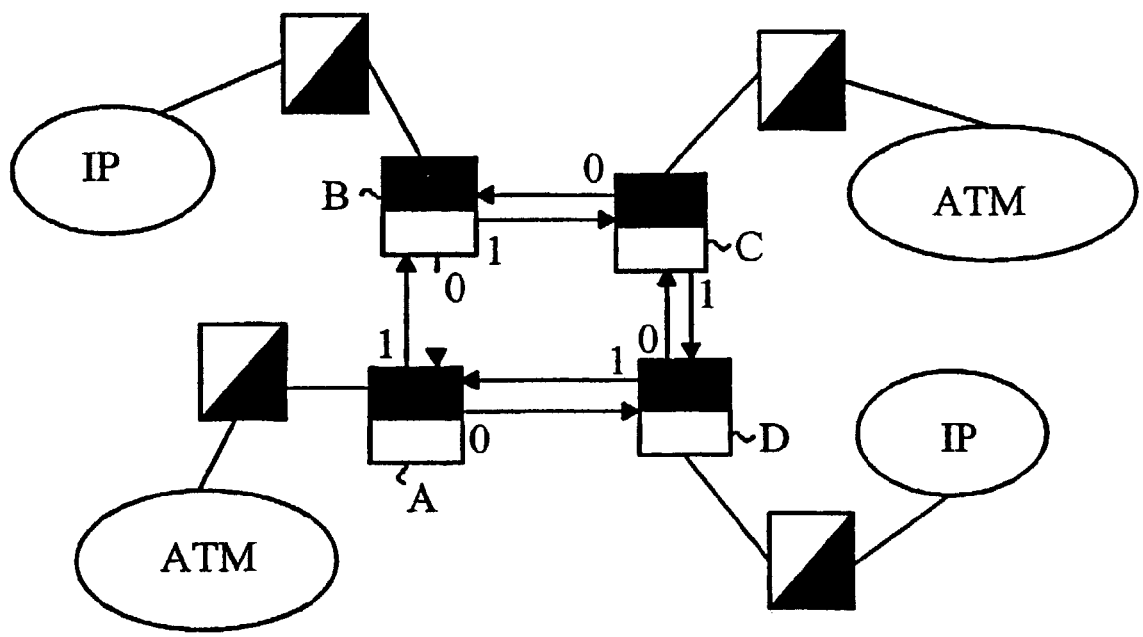
FIG. 3 represents one embodiment in accordance with the present invention.
Figure 3:
Figure 3:

FIG. 3 represents one embodiment in accordance with the invention. The telecommunication network consists of four telecommunication networks using the Internet protocol IP and the asynchronous transfer mode ATM, which are connected by four nodal points of the optical packet-switched network. Each network using the Internet protocol IP and the asynchronous transfer mode ATM is connected to a concentrator, which in turn is connected to the optical nodal point of the trunk network. The division of address and useful information for the period of the data transfer as shown by the invention is made in the routing node of the optical packet-switched network. For instance, the packet proceeds from the routing node A to node C. When the packet arrives at the routing node A, the routing address of the packet is read, in which case it is detected that the first bit of the address of the packet is 0, and so the address of the packet is re-modified, and the packet is sent to node C. In the routing node C it is detected that the packet has come to its destination, in which case the packet is taken off from the optical telecommunication network and is sent to the network of the asynchronous transfer mode.

In one embodiment in accordance with the invention, in the first routing point of the packet, a sufficient amount of routing bits are inserted into the packet by means of which the packet is routed without changing the address via the telecommunication network. In the routing points of the telecommunication network, a certain wavelength has to be always used. In that case, the routing of a packet in the telecommunication network is simpler, in which case the processing output needed in the routing is saved and the routing is made faster. On the other hand, for the routing of the packet it is worthwhile to use a small mirror compared to the cross-sectional area of the fiber. In that case, the mirror minimizes the output in the fiber as little as possible.

In another embodiment in accordance with the invention, the light to be transmitted on the address wavelength is transformed into an electronic form which is used to control the mirror of the useful wavelength. In the above case, the useful wavelength is routed quickly because there is no need to transform the useful wavelength into an electronic form. Also the delays of mirror equipment are well known. If there are other simultaneous connections belonging to the same optical fiber connection on different wavelengths, then these are directed in the same way as the connection to be routed, because the turning of the mirror into the initial position takes a certain delay. In that case, the front part and the back part of one cell have to be provided with a guard time. The method functions both with packets to be sent at different frequencies and with packets to be sent at just one frequency. In the latter case, the rate of the data transfer may suffer somewhat.

Figure 4:
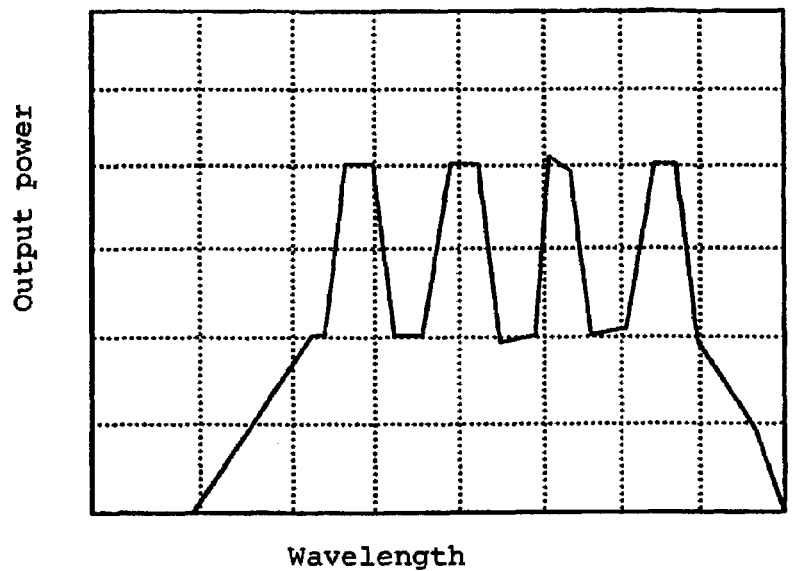
FIG. 4 represents one illustration of the spectre of the wavelength of an optical cable in accordance with the invention.

FIG. 4 represents one illustration of the wavelength spectrum of an optical cable. Axis X is the wavelength and axis Y is the output power. The spectrum of light is used to transmit four information channels which are shown in the figure as peaks. One of the channels is used to transfer the address information, whereas the other channels transmit the useful information to be transported.

Figure 5:
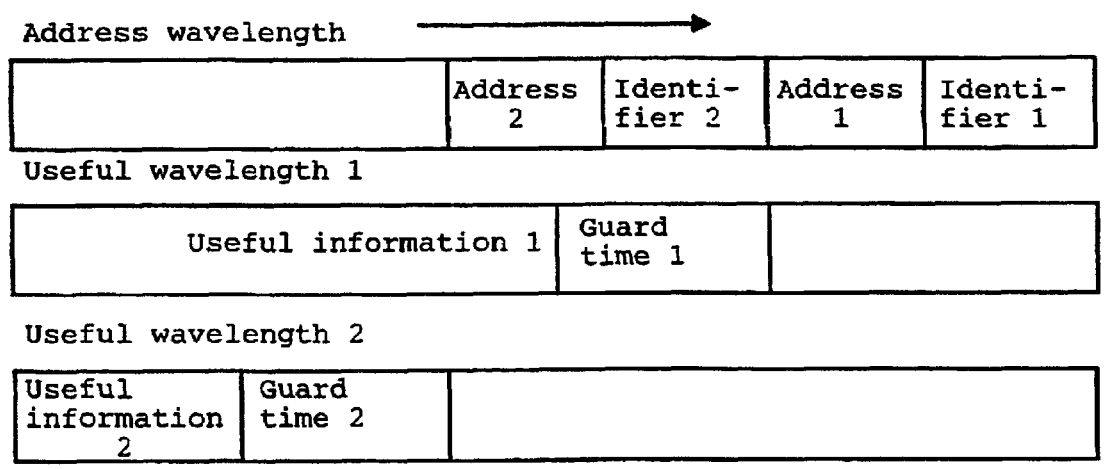
FIG. 5 represents one mode of coding of wavelengths of light.

FIG. 5 represents one mode of coding of the wavelength of light. The arrow in FIG. 5 shows the direction of the flow of the telecommunication traffic. The recipient sees the identifier 1 as the first piece of information. The identifier to be transmitted on the address wavelength determines which wavelength the address coming thereafter the identifier handles. The address to be transmitted on the address wavelength in turn determines the fact of how the useful wavelength to be identified based on the identifier is routed. If the routing of the telecommunication network is based on colors, i.e. certain wavelengths of color of light go into each new node, then the address may consist of the code determining the routing which determines the following wavelength. In that case, the address is called a color code. In the case of the example, the identifier 1 means the same as the useful wavelength 1, which is routed after the lapse of the guard time 1 based on the address 1.

The invention is not restricted merely to examples of its embodiments referred to above, instead many variations are possible within the scope of the inventive idea defined by the claims.

The invention claimed is:

1. A method of transferring packet-switched information in an optical fiber system, wherein the optical fiber system comprises an optical fiber, the method comprising:
   transmitting identifier information on a single address wavelength;
   transmitting address information on the single address wavelength;
   after transmitting the identifier information and the address information, transmitting corresponding payload information on a plurality of payload wavelengths different from the single address wavelength, wherein the payload information comprises a plurality of payload packets, wherein each of the plurality of payload packets is associated with an address included in the address information, and wherein the plurality of payload wavelengths are identified by the identifier information; and
   routing the plurality of payload packets on the plurality of payload wavelengths for transmitting the payload information based on the corresponding address information;
   wherein only the identifier information and the address information are transmitted on the single address wavelength.

2. A method as claimed in claim 1, wherein the address is transmitted after a corresponding identifier included in the identifier information.

3. A method as claimed in claim 1, wherein the packet-switched information is transmitted in the optical fiber by wavelength division multiplexing.

4. A method as claimed in claim 1, wherein at least one of the address information or the packet-switched information is routed on an optical transmission network level.

5. A method as claimed in claim 1, wherein a guard time is added before the address information so that transfer of different wavelengths at different times is evened out.

6. A method as claimed in claim 1, wherein a guard time is added after the address information and before the payload information so that the transfer of different wavelengths at different times is being evened out, wherein the guard time is measured between an end of an address corresponding to the one of the plurality of payload packets and a start of the one of the plurality of packets.

7. A method as claimed in claim 1, wherein a guard time is added after the payload information so that transfer of different wavelengths at different times is evened out.

8. A method as claimed in claim 1, wherein at least part of the packet-switched information includes information in accordance with an asynchronous transfer mode (ATM).

9. A method as claimed in claim 1, wherein at least part of the packet-switched information includes information in accordance with an Internet protocol (IP).

10. A method as claimed in claim 1, wherein at least one wavelength is reserved for the payload information for the transfer of the packet-switched information.

11. A method as claimed in claim 1, wherein color codes are used as packet addresses in the optical fiber on the address wavelength, and wherein the color codes are extinguished in conjunction with routing when the address information has been received.

12. A method as claimed in claim 1, wherein the address information and the payload information are based on a single packet of packet-switched information.

13. A method of transferring packet-switched information in a telecommunications system, wherein the telecommunication system includes a telecommunications network coupled to an optical fiber, and a router coupled to the optical fiber, the method comprising:
   optically transmitting identifier information and address information from the telecommunications network to the router, wherein the identifier information and the address information are transmitted on a single address wavelength; and
   optically transmitting payload information from the telecommunications network to the router on a plurality of payload wavelengths, wherein the payload information includes a plurality of payload packets;
   wherein the plurality of payload wavelengths are different from the single address wavelength and are identified by the identifier information;
   wherein the address information is transmitted before the corresponding payload information; and
   wherein the identifier information includes an identifier of each of the plurality of payload wavelengths.

14. A method as claimed in claim 13, wherein on the single address wavelength only addresses and identifiers are transmitted.

15. A method as claimed in claim 13, wherein information is transferred in the optical fiber by wavelength division multiplexing.

16. A method as claimed in claim 13, wherein at least one of the address information or the packet-switched information is routed on an optical transmission network level.

17. A method as claimed in claim 13, wherein a guard time is added before the address information so that transfer of different wavelengths at different times is evened out.

18. A method as claimed in claim 13, wherein a guard time is added after the address information and before the payload information so that transfer of different wavelengths at different times is evened out, wherein the guard time is measured between an end of an address corresponding to one of the plurality of payload packets and a start of the one of the plurality of packets.

19. A method as claimed in claim 13, wherein a guard time is added after the payload information so that transfer of different wavelengths at different times is evened out.

20. A method as claimed in claim 13, wherein at least part of the packet-switched information is transmitted in accordance with an asynchronous transfer mode.

21. A method as claimed in claim 13, wherein at least part of the packet-switched information is transmitted in accordance with an Internet protocol.

22. A method as claimed in claim 13, wherein at least one wavelength is reserved for transfer of the packet-switched information.

23. A method as claimed in claim 13, wherein color codes are used as packet addresses, and wherein the color codes are extinguished in conjunction with routing when a packet address has been received.

24. A system for transfer of packet-switched information, the system comprising:
   a communications network;
   a router; and
   an optical fiber coupled to the communications network and the router for optically transmitting identifier information, address information, and payload information from the communications network to the router;
   wherein the identifier information and the address information are transmitted on a single address wavelength, wherein the payload information includes a plurality of payload packets and is transmitted on a plurality of payload wavelengths;

wherein the system is configured to transmit the address information before transmitting the payload information;

wherein the router routes the payload information on a plurality of payload wavelengths based on the address information transmitted on the single address wavelength; and wherein the identifier information identifies the plurality of payload wavelengths.

25. A system as claimed in claim 24, wherein the router comprises a response time counter configured to determine a guard time of a set form.

26. A system as claimed in claim 24, wherein the router comprises a multiplexing device configured to transfer wavelengths, by wavelength multiplexing, to the optical fiber.

27. A system as claimed in claim 24, wherein the router comprises a mirror configured to control the transmission of the plurality of payload packets on the plurality of payload wavelengths of the optical fiber based on address information to be transmitted on the address wavelength.

28. A system as claimed in claim 25, wherein the router comprises a filter configured to control the transmission of the plurality of payload packets on the plurality of payload wavelengths of the optical fiber based on the address information transmitted on the single address wavelength.

29. A system as claimed in claim 24, wherein the router comprises an extinguisher configured to extinguish the single address wavelength when the address has been received.

30. A system for transferring packet-switched information in a telecommunications system, the system comprising:
  a receiving unit configured to receive packet-switched information including address information and payload information, wherein the payload information comprises a plurality of payload packets;
  a first transmitting unit configured to transmit the address information; and
  a second transmitting unit configured to transmit the payload information after the address information;
  wherein the address information is transmitted on a single address wavelength following corresponding identifier information;
  wherein the payload information is transmitted on a plurality of payload wavelengths identified by the identifier information;
  wherein the telecommunications system is configured to transmit the address information before transmitting the corresponding payload information after lapse of a guard time;
  wherein the system further includes:
    a modulating device that changes the packet-switched information to the address wavelength and to the plurality of payload wavelengths;
    a demodulating unit configured to change the information from the single address wavelength and the plurality of payload wavelengths into packet-switched information and; and
    a router configured to route the payload information to be transferred on the plurality of payload wavelengths based on the address information transferred on the single address wavelength;
  wherein the telecommunications system includes:
    a telecommunications network;
    an optical cable coupled to the telecommunications network;
    an optical fiber to which at least two wavelengths of light are sent and which belongs to the optical cable; and
    the router which is coupled to the optical cable.

31. A system as claimed in claim 30, wherein the router comprises a response time counter configured to define a guard time of a standard format.

32. A system as claimed in claim 30, wherein the router comprises a multiplexing device configured to transfer wavelengths, by wavelength multiplexing, to the optical fiber.

33. A system as claimed in claim 30, wherein the router comprises a mirror configured to control the transmission of the plurality of payload wavelengths of the optical fiber based on the address information to be transmitted on the address wavelength.

34. A system as claimed in claim 30, wherein the router comprises a filter configured to control the transmission of the payload wavelengths of the optical fiber based on the address information transmitted on the address wavelength.

35. A system as claimed in claim 30, wherein the router comprises an extinguisher configured to extinguish the single address wavelength when the address has been received.

* * * * *

UNITED STATES PATENT AND TRADEMARK OFFICE
CERTIFICATE OF CORRECTION

| | | |
|---|---|---|
| PATENT NO. | : 7,596,316 B2 | Page 1 of 1 |
| APPLICATION NO. | : 10/239218 | |
| DATED | : September 29, 2009 | |
| INVENTOR(S) | : Hellman | |

It is certified that error appears in the above-identified patent and that said Letters Patent is hereby corrected as shown below:

On the Cover page, (*) Notice: Subject to any disclaimer, the term of this patent is extended or adjusted under 35 USC 154(b) by 550 days.

Delete the phrase "by 550 days" and insert -- by 739 days --.

Signed and Sealed this

Tenth Day of August, 2010

David J. Kappos
*Director of the United States Patent and Trademark Office*